Figure 1:
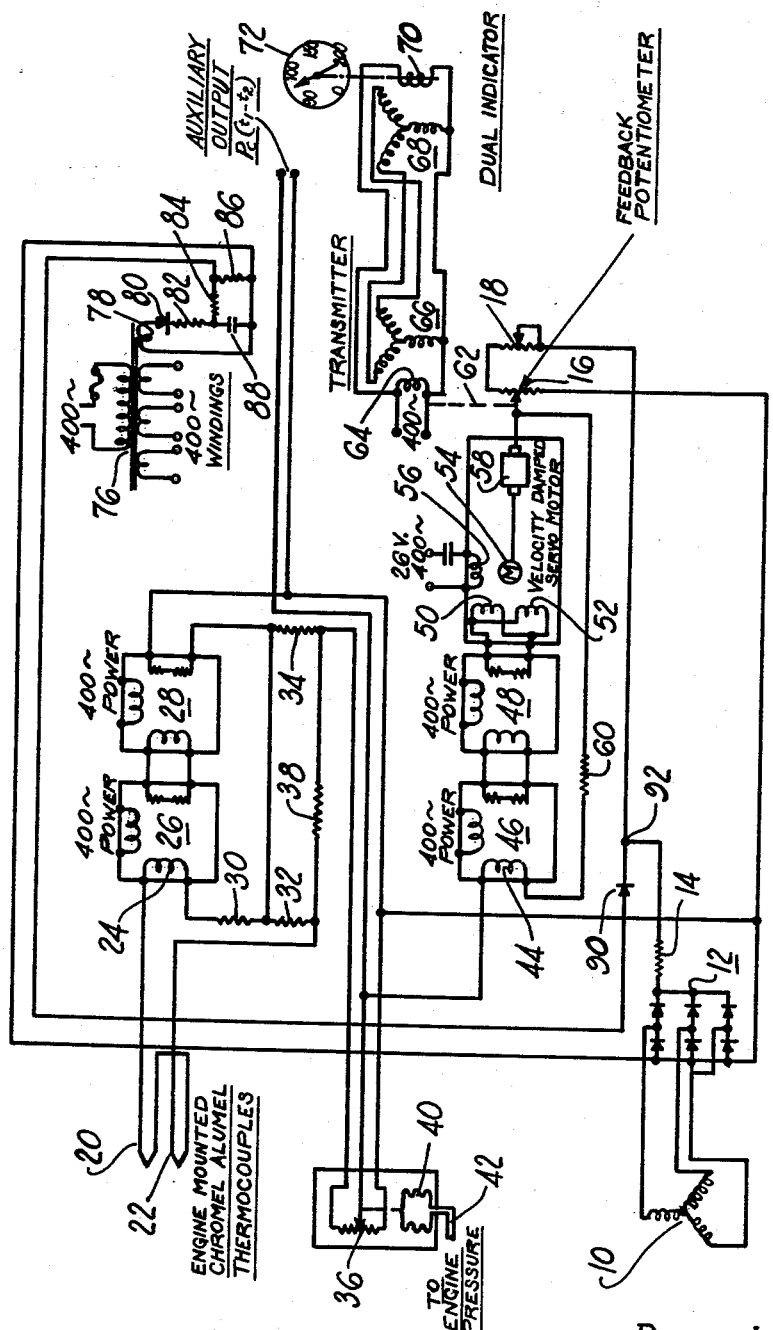

INVENTORS
DONALD W. HOWARD
WARNER C. WINTRODE
BY
Robert C. Smith
ATTORNEY

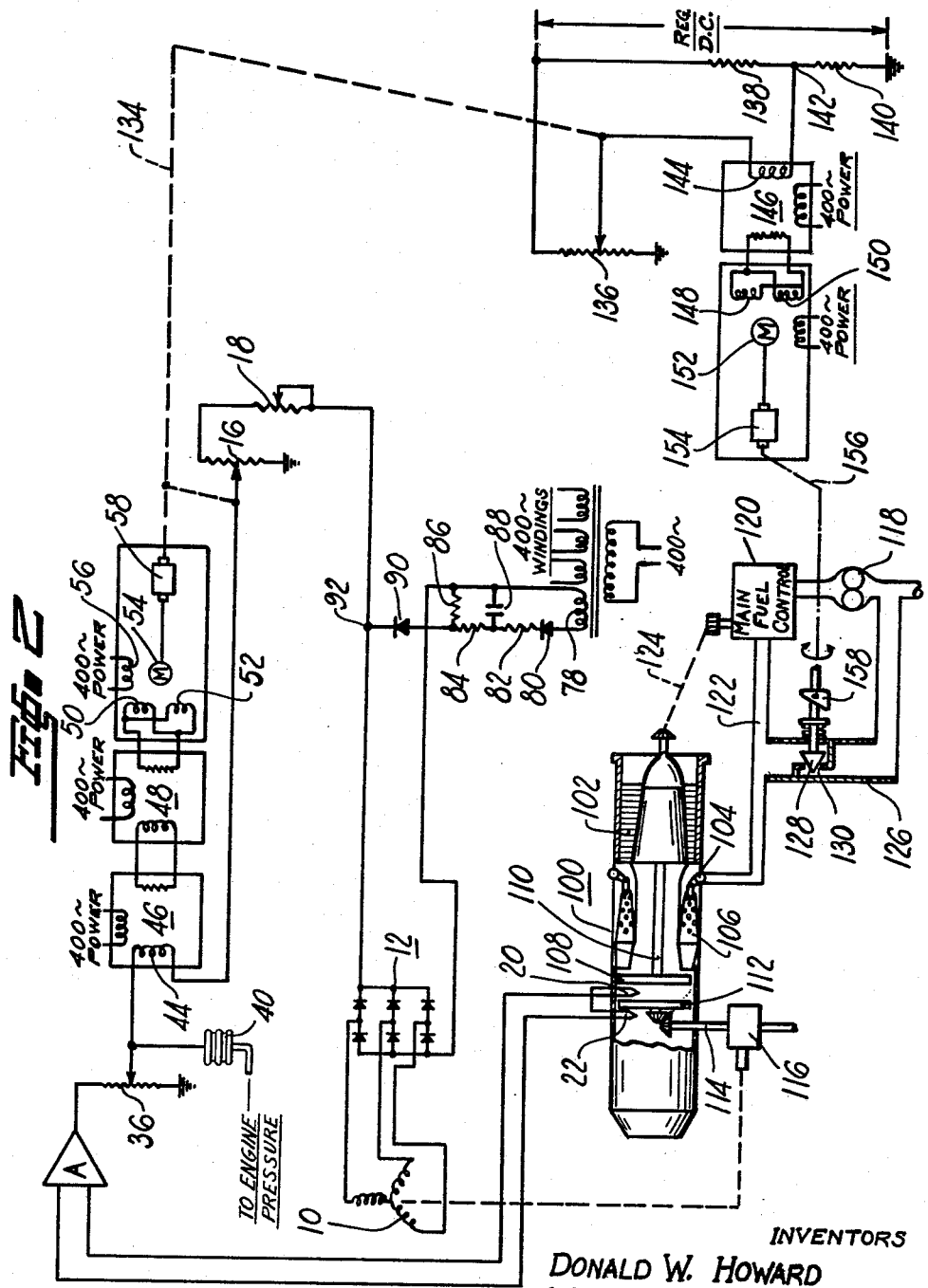

United States Patent Office 3,114,240
Patented Dec. 17, 1963

3,114,240
TORQUE INDICATOR AND CONTROL FOR TURBO-SHAFT GAS TURBINE ENGINE
Donald W. Howard and Warner C. Wintrode, South Bend, Ind., assignors to The Bendix Corporation, a corporation of Delaware
Filed Sept. 4, 1959, Ser. No. 838,158
6 Claims. (Cl. 60—39.16)

This invention relates to indicating and control systems and more particularly to a means for indicating and controlling the torque output of a gas turbine engine.

One well known type of gas turbine engine is that which uses two turbines, one of which extracts power from the engine to drive the compressor and the other which extracts power to drive an output shaft. In cases where this shaft is used to drive a propeller, the engine is often called a "turbo-prop" engine. Where the output shaft delivers power to a gear box and the power is utilized by other means, the engine is frequently termed a "turbo-shaft" engine. The turbo-shaft engine is useful as a prime mover for various types of stationary power applications, for automotive use, and for powering the rotors of helicopters. When such engines are used to operate helicopters, they are operated over a comparatively narrow speed range. The power which may be extracted from them bears a direct relationship to the torque which the engine is developing at a given instant. The pilot of a helicopter cannot judge by the speed of the engine whether or not its immediate power delivering capabilities are within the desired range and it is for this reason that torque indicators have been devised for giving an indication of the actual torque developed by the engine. Without such an indication, the pilot may cause the engine to actually deliver more torque than the rotors or drive train can safely absorb. Also, a torque indication is useful as an aid in operating the engine as near as possible to its point of lowest specific fuel consumption. The torque indicators presently in use, however, have generally attempted to sense and indicate torque directly which is difficult and requires expensive means for measuring the amount of twisting deflection of the driven shaft. For these reasons it has been found desirable to develop a torque indicating device which measures torque indirectly through sensing of engine operating conditions which are much easier to measure. From well known formulas giving the horsepower output of a gas turbine engine it has been established that the value of torque may be represented by the following relationship:

$$T = \frac{K_1(t_1-t_2)P_c}{N\sqrt{t_1}}$$

where $T$ = Torque
$t_1$ = turbine inlet temperature in degrees Rankine
$t_2$ = turbine outlet temperature in degrees Rankine
$P_c$ = compressor discharge pressure in p.s.i.
$N$ = engine speed in r.p.m.
$K_1$ = a constant which may vary from engine to engine and is determined empirically.

Because changes in $t_1$ are usually quite small for an engine operating over a narrow speed range, the factor $\sqrt{t_1}$ may be incorporated as part of the constant leaving only three variable conditions to be sensed; the temperature drop across the power turbine, compressor discharge pressure, and power turbine rotational speed. Sensing devices for these conditions have been used in the gas turbine fuel control art and have been developed to the point where there accuracy and reliability are quite acceptable. It is, therefore, an object of the present invention to provide a computing system for giving an indication of instantaneous values of torque through the use of means capable of accurately and reliably sensing variable other than torque.

It is another object of the present invention to provide a torque indicating system which is more accurate and less expensive to produce than those presently in use.

It is another object of the present invention to provide a torque indicating device which is durable, reliable, and which can be constructed within minimum size and weight limitations.

It is another object to provide a control system which controls engine torque and which utilizes the output of a torque indicating device accomplishing the above objects as a feedback signal to be compared with a reference signal.

Other objects and advantages will appear from the following specification taken in connection with the accompanying drawings in which:

FIGURE 1 is a schematic diagram of a torque indicating device incorporating the teachings of our invention; and FIGURE 2 is a schematic diagram of a torque control system which utilizes the output of the indicating system of FIGURE 1 to replace a torque sensor, which output is compared with a reference to drive a control signal effective to vary fuel feed.

Referring to FIGURE 1, an engine driven alternating current three-phase tachometer is shown at numeral 10 having its output rectified by means of a three-phase full-wave rectifier, shown generally at 12. The output of this rectifier is a direct current voltage proportional to engine speed and is impressed across a dropping resistor 14, and a feedback potentiometer 16 through a calibrating variable resistance device 18. The temperature drop across the power turbine of a gas turbine engine (not shown) is sensed by means of a pair of thermocouples 20 and 22 connected in a bucking arrangement so that the output of the thermocouples is a direct current voltage responsive to the temperature difference $(t_1-t_2)$ sensed. This differential voltage is supplied across the input winding 24 of a magnetic amplifier having a first stage 26 and a second stage 28, and a pair of resistors 30 and 32. The output from stage 28 is an amplified direct current signal proportional to the temperature drop as sensed by the thermocouples 20 and 22 and this voltage is developed across a feedback resistor 34 and a potentiometer 36. A portion of the voltage output of stage 28 selected across the resistor 34 is supplied through a resistor 38 in opposition to the input to the magnetic amplifier for stabilization. Connected to the slider of potentiometer 36 is a bellows 40 which is in communication through a conduit 42 with a fluid pressure sensed in the engine such as compressor discharge pressure. The voltage drop across potentiometer 36 is directly proportional to the temperature difference sensed by thermocouples 20 and 22 and by means of the linkage shown herein this temperature voltage is multiplied by the pressure signal from bellows 40 acting through the slider of potentiometer 36 such that the signal picked off by the slider of potentiometer 36 is directly proportional to the temperature difference $(t_1-t_2)$ multiplied by compressor discharge pressure. This signal is supplied to the input winding 44 of the magnetic amplifier having a plurality of stages similar to stages 26 and 28 described above. The output of the last stage 48 appears across a pair of output windings 50 and 52 connected in a bucking arrangement such that the effective polarity of the output of the magnetic amplifier is dependent upon the polarity of the input signals supplied to winding 44. These output windings effectively constitute the variable phase of a two-phase servomotor having an armature 54 and a fixed phase 56. Rotation of the servomotor is in a direction and at a velocity controlled by the polarity and magnitude of the input signal supplied to the input winding 44. This two-phase servomotor may be of a type commercially available in which velocity responsive damping means is incorporated to avoid hunting. Armature 54 drives into a gear box 58 which reduces the output speed of the motor and acts to control the position of the slider on feedback potentiometer 16. The signal selected by the slider of potentiometer 16 is fed back to the input winding 44 through a dropping resistor 60 in opposition to the input from the potentiometer 36. When the signal supplied to winding 44 from potentiometer 36 is not equal to that selected on potentiometer 16, the armature 54 is rotated and the slider of potentiometer 16 is repositioned until a null again appears on winding 44. From this arrangement it will be seen that the actual rotation of the armature 54 is proportional to temperature differential $(t_1-t_2)$ times compressor discharge pressure divided by the engine rotational speed. This rotation results in an angular displacement at the output of the gear box 58 which is supplied through a mechanical linkage 62 to the rotatable element 64 of a synchro transmitter 66. The synchro receiver 68 also includes a rotating element 70 which always seeks the same angular position as the member 64 in a manner well known in the art. The movable coil 70 of the receiver 68 is directly connected to an indicating device 72 which may be calibrated as desired. In this case, the indicator 72 is shown as calibrated in terms of percentage of full engine torque, the values of torque in excess of 100% of rated output appearing on the right side of the scale. Such a reading would call to the attention of the operator the fact that the engine was being over-torqued and he could then take whatever appropriate action was required, such as reducing fuel flow to the engine.

It will be appreciated that at very low engine speeds, the computation described above might conceivably give rise to erroneous torque readings because of the factor of division by a number approaching zero. In order to avoid this error, a minimum speed reference circuit has been provided to assure that the speed signal selected across potentiometers 16 and 18 will always be representative of speeds at least equal to 25% of maximum engine speed. The power transformer 76 includes a secondary winding 78 having its output rectified by a diode 80 and which energizes a voltage dividing circuit containing resistors 82, 84 and 86. A capacitor 88 acts to provide some filtering of the voltage across resistor 86. This voltage is effectively a direct current voltage proportional to 25% of maximum engine speed. It is connected through a diode 90 to a terminal 92 which is the same terminal to which the speed responsive alternator 10 and the rectifier 12 are connected. When the speed of the engine is below 25% of maximum, the voltage at terminal 92 is such that the diode 90 will conduct and a signal directly proportional to 25% of maximum engine speed is supplied to potentiometers 16 and 18. When the engine speed is above 25% of maximum, the voltage at terminal 92 is in excess of the voltage across resistor 86 and the diode 90 does not conduct.

This system computes torque according to the equation $$T_1 = \frac{K_1(t_1-t_2)P_c}{N}$$

In FIGURE 2 is shown a torque control system incorporating many of the components of FIGURE 1, which components will be given the same numbers as they have in FIGURE 1. In the system of FIGURE 2, a gas turbine engine is shown generally at numeral 100 including a compressor 102, a fuel manifold 104, combustion cans or burners 106, a compressor turbine 108 connected to the compressor 102 by means of a shaft 110 and a power turbine 112 rotatable independently of the compressor turbine 108 which is connected through a mechanical drive 114 to a gear box 116. Fuel is supplied to the manifold 104 from a source (not shown) by means of a pump 118 which pressurizes fuel to a main fuel control 120 and a conduit 122. The main fuel control 120 may be any of several types well known in the industry and may be similar to that shown in the patent to Howard J. Williams No. 2,786,331. A direct mechanical connection 124 is supplied from the compressor 102 to the main fuel control 120 to provide a speed signal to said fuel control. Means are provided for withdrawing a portion of the fuel supplied by the main control 120 to the engine including a by-pass conduit 126 which is in communication with the upstream side of pump 118 and which includes a valve 128 axially movable in a port 130 to control the amount of fuel by-passed. The temperature drop across the power turbine 112 is sensed by means of the thermocouples 20 and 22 which are connected in a bucking arrangement so that the temperature difference signal is supplied to the input of an amplifier 142 which may be similar to the amplifier stages 26 and 28 shown in FIGURE 1. The output of this amplifier which is a direct current signal proportional to the temperature difference sensed by the thermocouples 20 and 22 is impressed across the potentiometer 36. The slider of potentiometer 36 is positioned by means of the bellows 40 which is movable in response to changes in compressor discharge pressure of the engine 100. The signal selected by the slider of potentiometer 36 is therefore proportional to the product of the temperature differential selected by the thermocouples and the compressor discharge pressure and this signal is supplied to the input winding 44 of magnetic amplifier stage 46. This signal is further amplified in magnetic amplifier stage 48 and it appears in the output of this stage as an unbalance in the voltage drops across the output windings 50 and 52. These windings constitute the variable phase winding of the two-phase motor having armature 54 and fixed phase winding 56. The armature 54 drives a shaft which is connected to a gear box 58 where reduction gearing is employed and rotation of the slider on potentiometer 16 is effected thereby.

The speed sensing arrangement is also identical to that shown in FIGURE 1, the three-phase alternator 10 driven by gear box 116 supplies alternating current to a bank of rectifiers 12 thereby supplying to the potentiometer 16 and the gain adjustment resistor 18 a direct current voltage proportional to instantaneous values of the rotational speed of the power turbine 112. The speed signal selected on potentiometer 16 is fed to the input winding 44 of the magnetic amplifier stage 46 thereby providing an arrangement whereby the rotation of armature 56 and the output of the gear box 58 is always proportional to the temperature drop across the turbine times the compressor discharge pressure divided by the rotational speed of the power turbine 112. As set forth above, this constitutes an instantaneous indication of engine torque and this rotation is further communicated through the mechanical linkage 134 to the slider of a potentiometer 136 which has impressed across it a regulated direct current voltage of a desired value. The signal selected by the slider of potentiometer 136 is, therefore, a direct indication of instantaneous engine torque. Also connected to the same regulated direct current voltage source is a voltage dividing network consisting of a resistor 138 and a resistor 140 which constitute a torque reference circuit inasmuch as the signal selected at terminal 142 will be a direct current voltage proportional to a desired maximum value of engine torque. This signal is directly bucked against the instantaneous torque signal supplied from the slider of potentiometer 136 in the input winding 144 of magnetic amplifier 146. This input signal, therefore, constitutes a torque error signal which is amplified in the magnetic amplifier 146 and appears as a voltage differential across the output windings 148 and 150 which operate to cause rotation of the armature 152 in a manner identical to that of armature 56 described above. Armature 152 drives through a gear box 154 to effect a speed reduction and the output of gear box 154 acting through mechanical link 156 effects a rotation of a cam 158 which controls the position of valve member 128 in orifice 130 and thereby determines the amount of fuel by-passed from the conduit 122 to the inlet of pump 118.

The minimum speed reference circuit of FIGURE 2 is identical to that shown in FIGURE 1 in that there is supplied to the junction 92 a direct current signal which is directly proportional to 25% of maximum power turbine rotational speed. Should the actual speed as indicated by the output of the rectifier bank 12, be less than the simulated speed circuit supplied from the minimum speed circuit, this 25% speed signal will be supplied to the potentiometer 16 and the gain adjustment rheostat 18. In cases where engine speed is actually above 25% of the minimum of the maximum speed, the voltage at terminal 92 will be higher than the voltage on the opposite side of the diode 90 and this diode will therefore not conduct. The power transformer 76 is shown as having a 400 cycle supply and this voltage has been chosen simply because it is typical of current practice. Obviously, other suitable voltages may be used if desired. In considering the operation of the device described above, let us first consider operation in which the signal proportional to instantaneous values of engine torque as selected by the slider on potentiometer 136 is equal to the signal selected by the voltage divider which constitutes a torque reference signal. In this case, these two signals effectively cancel across input winding 144, there is therefore no rotation of the armature 152 and the cam 158 will maintain its position thus maintaining a certain desired amount of by-pass through conduit 126 to the input of pump 118. Under these conditions, the fuel flow to the engine is controlled entirely through the action of the main fuel control 120. Should the engine torque exceed predetermined safe limits, this will be reflected in a change in one or more of the conditions which go to make up the torque signal; e.g., the temperature differential across the power turbine increases, the compressor discharge pressure increases, or the speed decreases, any of which will result in an increase in the instantaneous torque developed by the engine. When this occurs, the voltage selected on potentiometer 136 will exceed the voltage supplied by the reference and an error signal will be supplied to the magnetic amplifier 146 which will cause a rotation of the armature 152 and a consequent rotation of cam 158 in such direction as to cause an increase in the effective area of orifice 130, thereby by-passing a greater amount of fuel from the conduit 122 to the upstream side of pump 118. A reduction in fuel flow will, of course, very quickly cause a reduction in either a temperature drop across the turbine, compressor discharge pressure, or both. Should torque delivered be under the reference value, the reference voltage will exceed that selected on potentiometer 136 and the resulting error voltage will cause armature 152 to rotate in the opposite direction, thus causing less fuel to be withdrawn from the conduit 122. Should a purely limiting action be desired, it is obvious that a stop may be employed to limit rotation of the armature in a direction to reduce by-pass flow. And while the torque reference has been shown as a constant voltage, it may be varied with any desired engine operating condition such as rotational speed.

While only one embodiment of the torque control system and the torque indicating system have been shown and described herein, modifications may be made to suit the requirements of any given application without departing from the scope and spirit of the invention.

We claim:

1. For use with a gas turbine engine having a compressor, a combustion chamber, a compressor turbine and a power turbine, and a main fuel control for supplying fuel to said combustion chamber, a torque limiter comprising a by-pass valve downstream of said fuel control, an electro-responsive device for driving said valve to control the amount of fuel by-passed, means including a plurality of thermocouples connected in a bucking configuration for producing a voltage proportional to the temperature difference across the power turbine, means for amplifying said temperature difference signal and for impressing said signal across a first potentiometer, pressure sensing means responsive to compressor discharge pressure connected to the slider of said potentiometer to vary the output thereof with charges in compressor discharge pressure, amplification means for amplifying voltage output of said potentiometer, means producing a direct current signal directly proportional to instantaneous values of rotational speed of the power turbine and impressing this signal across a second potentiometer, means connecting the slider of said second potentiometer to the input of said second named amplification means, motor means driven by said second amplification means for positioning the slider of said second potentiometer, a third potentiometer connected to a source of regulated direct current voltage and having its slider positioned by said motor means, a torque reference circuit for producing a voltage proportional to a desired value of engine torque, and means comparing said reference voltage with the voltage from said third potentiometer to produce a torque error voltage, and amplification means for amplifying said torque error voltage and driving said electro-responsive device.

2. A device for indicating the torque developed by gas turbine engine having a power turbine, comprising means including a plurality of thermocouples connected in a bucking configuration for producing a voltage proportional to the temperature difference across the power turbine, means for amplifying said temperature difference signal and for impressing said signal across a first potentiometer, pressure sensing means responsive to a compressor generated pressure connected to the slider of said potentiometer to vary the output thereof with changes in said pressure, second amplification means for amplifying the voltage output of said potentiometer, means producing a direct current signal directly proportional to instantaneous values of rotational speed of the power turbine and impressing the signal across a second potentiometer, means connecting the slider of said second potentiometer to the input of said second amplification means, motor means driven by said second amplification means for positioning the slider of said second potentiometer, a synchro transmitter having a rotor winding connected to said motor means, a synchro receiver having a rotor winding, and an indicating device connected to said receiver rotor winding.

3. A device for indicating the torque developed by gas turbine engine having a power turbine comprising means producing a voltage proportional to the rotational speed of the power turbine, means for producing a voltage proportional to the temperature difference across the power turbine and for impressing said signal across a potentiometer, pressure sensing means responsive to a compressor generated pressure connected to the slider of said potentiometer to vary the output thereof with changes in said pressure, amplification means for amplifying the voltage output of said potentiometer, means producing a direct current signal directly proportional to instantaneous values of rotational speed of the power turbine and impressing the signal across a second potentiometer, means connecting the slider of said second potentiometer to the input of said amplification means, motor means driven by said amplification means for positioning the slider of said second potentiometer, and indicating means connected to the slider of said second potentiometer for indicating instantaneous values of engine torque.

4. For use with a gas turbine engine having a compressor, a compressor turbine and a power turbine, means for indicating the instantaneous value of engine torque comprising an indicating device, a potentiometer having its slider connected to said indicating device, means for producing a signal proportional to the speed of the power turbine and impressing said signal across said potentiometer, means producing a signal proportional to the temperature difference across said power turbine, means producing a signal proportional to the discharge pressure of the compressor, a servomotor connected to said slider and an amplification device for driving said servomotor, means producing a signal proportional to the product of said pressure and temperature difference signal and for supplying said signal to the input of said amplification device, and means connecting the signal selected on said slider with the input of said amplification device.

5. A torque indicating device as set forth in claim 4 including means for producing a signal proportional to a desired minimum power turbine speed, and means for overriding said speed signal with said minimum speed signal when said speed signal is indicative of power turbine speeds below said minimum speed value.

6. For use with a gas turbine engine having a compressor, a compressor turbine and a power turbine, means for indicating the instantaneous value of engine torque comprising means producing a first signal proportional to rotational speed of the power turbine, means producing a second signal proportional to the product of the temperature drop across the power turbine times a compressor generated pressure, means for dividing said second signal by said first signal to produce a third signal proportional to engine torque, and indicating means responsive to said third signal, said indicating means including a synchro transmitter having a rotor winding movable in proportion to said third signal, a synchro receiver having a rotor winding, and an indicating device connected to said receiver rotor winding.

No references cited.